United States Patent
Symes, Jr. et al.

(10) Patent No.: US 7,521,390 B2
(45) Date of Patent: Apr. 21, 2009

(54) ULTRA LOW TEMPERATURE FIXED X7R AND BX DIELECTRIC CERAMIC COMPOSITION AND METHOD OF MAKING

(75) Inventors: Walter J. Symes, Jr., Dundee, NY (US); Mike S. H. Chu, Lewiston, NY (US)

(73) Assignee: Ferro Corporation, Cleveland, OH (US)

( * ) Notice: Subject to any disclaimer, the term of this patent is extended or adjusted under 35 U.S.C. 154(b) by 57 days.

(21) Appl. No.: 11/681,796

(22) Filed: Mar. 5, 2007

(65) Prior Publication Data

US 2008/0218935 A1 Sep. 11, 2008

(51) Int. Cl.
*C04B 35/468* (2006.01)

(52) U.S. Cl. .................. 501/138; 501/139; 361/321.4; 264/615

(58) Field of Classification Search .......... 501/138, 501/139; 361/321.4; 264/615
See application file for complete search history.

(56) References Cited

U.S. PATENT DOCUMENTS

| | | | |
|---|---|---|---|
| 5,128,289 A | 7/1992 | Wilson | |
| 5,296,426 A | 3/1994 | Burn | |
| 5,550,092 A | 8/1996 | Chu et al. | |
| 5,571,767 A | 11/1996 | Wilson et al. | |
| 5,635,435 A | 6/1997 | Shibata | |
| 5,646,080 A | 7/1997 | Chu et al. | |
| 5,858,901 A | 1/1999 | Chu et al. | |
| 5,990,029 A | 11/1999 | Satoh et al. | |
| 5,994,253 A | 11/1999 | Sasaki et al. | |
| 6,185,087 B1 | 2/2001 | Park et al. | |
| 6,225,250 B1 | 5/2001 | Wada et al. | |
| 6,284,216 B1 | 9/2001 | Sakai et al. | |
| 6,403,513 B1 | 6/2002 | Sato et al. | |
| 6,411,495 B2 | 6/2002 | Wada et al. | |
| 6,544,916 B1 | 4/2003 | Sato et al. | |
| 6,548,437 B2 | 4/2003 | Sato et al. | |
| 6,559,084 B1 | 5/2003 | Fujikawa et al. | |
| 6,699,809 B2 | 3/2004 | Fujikawa et al. | |
| 6,723,673 B2 | 4/2004 | Maher et al. | |
| 6,764,976 B2 | 7/2004 | Kobayashi et al. | |
| 6,800,270 B2 | 10/2004 | Nomura et al. | |
| 6,809,052 B2 | 10/2004 | Horie et al. | |
| 6,828,266 B1 | 12/2004 | Park et al. | |
| 6,829,137 B2 | 12/2004 | Konaka et al. | |
| 7,022,635 B2 | 4/2006 | Wang et al. | |
| 7,061,748 B2 | 6/2006 | Ito et al. | |
| 7,161,795 B1 | 1/2007 | Megherhi et al. | |
| 2006/0232910 A1 | 10/2006 | Megherhi et al. | |
| 2007/0018776 A1 | 1/2007 | Tanaka et al. | |

*Primary Examiner*—Karl E Group
(74) *Attorney, Agent, or Firm*—Rankin, Hill & Clark LLP (57) ABSTRACT

Multilayer ceramic chip capacitors which satisfy X7R and BX requirements and which are compatible with silver-palladium internal electrodes are made in accordance with the invention. The capacitors exhibit desirable dielectric properties (high capacitance, low dissipation factor, high insulation resistance), excellent performance on highly accelerated life testing, and very good resistance to dielectric breakdown. The dielectric layers comprise a lead-free and cadmium-free barium titanate base material doped with other metal oxides such oxides of zinc, boron, bismuth, cerium, tungsten, copper, manganese, neodymium, niobium, silver, barium, silicon and nickel in various combinations. The dielectric ceramic materials herein can be sintered together (fired) at less than 1000° C. with an inner electrode having more than 80 wt % Ag and less than 20 wt % Pd to form a multilayer ceramic capacitor (MLCC).

25 Claims, 1 Drawing Sheet

Figure 1

ULTRA LOW TEMPERATURE FIXED X7R AND BX DIELECTRIC CERAMIC COMPOSITION AND METHOD OF MAKING

BACKGROUND OF THE INVENTION

1. Field of Invention

This invention relates to lead-free and cadmium-free barium titanate based dielectric compositions, and more particularly to barium titanate based dielectric compositions having relatively small proportions of guest ions such as zinc, boron, bismuth, cerium, tungsten, copper, manganese, neodymium, niobium, silver, barium, silicon and nickel dispersed within the barium titanate crystal matrix. Such a dielectric composition can be used to form multilayer ceramic chip capacitors having internal electrodes formed of palladium or silver, or mixtures or alloys of the two.

In particular, the present invention relates to a lead-free, cadmium-free, ultra low temperature fired dielectric ceramic composition system in which the dielectric constant does not alter from its base value by more than 15 percent over a wide temperature range. Also, the dielectric constant does not alter from its base value by more than 25 percent over a wide temperature range when a DC bias voltage is applied. More specifically, this invention relates to a dielectric ceramic composition with a dielectric constant of over 2000 which is formed by firing a base ceramic oxide mixture at a temperature not exceeding 1000° C.

2. Description of Related Art

Multilayer ceramic chip capacitors (MLCC) have been widely utilized as miniature-sized, high capacitance, and high reliability electronic components. In accordance with increasing demands for high-performance electronic equipment, multilayer ceramic chip capacitors also have encountered marketplace demand for smaller size, higher capacitance, lower cost, and higher reliability. Tightening environmental regulations militate in favor of capacitors, and hence dielectric compositions that are free of lead and cadmium.

Multilayer ceramic chip capacitors generally are fabricated by forming alternating layers of a dielectric layer-forming paste and an internal electrode forming paste. Such layers are typically formed by sheeting, printing, or similar techniques, followed by concurrent firing. Generally, the internal electrodes have been formed of conductors such as palladium, gold, silver or alloys of the foregoing.

Conventional ceramic dielectric formulations lacking lead and cadmium often require sintering temperatures above 1250° C. The addition of lead or cadmium or compounds containing lead and/or cadmium, can reduce sintering temperatures from above 1250° C. to the range of about 1050° C. to about 1150° C. so that metal paste having a metal component that contains less than 80% silver and more than 20% palladium may be used as inner electrodes.

The Electronic Industry Association (EIA) prescribes a standard for the temperature coefficient of capacitance (TCC) known as the X7R characteristic. The X7R characteristic requires that the change of capacitance be no greater than ±15% over the temperature range from −55° C. to +125° C. For MLCCs designed for high voltage applications, the industry also prescribes a standard for the temperature coefficient of capacitance with a DC voltage bias applied (TCVC) known as the BX characteristic. The BX characteristic requires that the change of capacitance be no greater than ±25% over the temperature range from −55° C. to +125° C. when a DC bias voltage is applied. The percentage capacitance deviations in both the X7R and BX characteristics are measured from a reference temperature of 25° C.

SUMMARY OF THE INVENTION

Based on the foregoing, the art lacks a method of producing a dielectric ceramic composition system that can be fired at less than 1000° C., which has a dielectric constant of greater than 2000, is free of lead and cadmium in any form, and is suitable for use with internal Pd/Ag electrodes having more than 80% Ag and less than 20% Pd. Further, the art lacks a dielectric material, which, when fired to form electronic devices, with a stable TCC (temperature characteristic) and also with a stable TCVC (temperature characteristic with DC bias voltage) when a DC bias voltage is applied. Such a material would permit the use of a less costly electrode material, including a metal component comprising less Pd (which is relatively expensive) and more Ag (which is relatively inexpensive) such as at least 80% Ag and less than 20% Pd, about 85% Ag/15% Pd, about 90Ag %/10% Pd, or about 95% Ag/5% Pd, or about 99% Ag/1% Pd, up to 100% Ag and values in between, (percentages by weight) without sacrificing capacitor performance.

The present invention provides a dielectric composition system that can be used to make ceramic multilayer capacitors compatible with internal electrodes containing at least 80 wt % Ag and less than 20 wt % Pd, either as mixtures or as alloys of the metals. The dielectric materials herein and capacitors made therefrom are devoid of lead and cadmium in any form. The capacitors may be formed from the dielectric composition of the present invention to exhibit a stable dielectric constant with a small dielectric loss and also a stable dielectric constant with a small dielectric loss when a DC bias voltage is applied.

The dielectric composition of the present invention comprises a uniform dense microstructure of grains having an average diameter of about 0.5 to about 3 microns. A uniform and dense grain microstructure is critical in achieving high reliability multilayer capacitors having dielectric layers thinner than 5 microns.

In a first embodiment, the dielectric composition of the present invention comprises, prior to firing, a blend of the oxides of $BaTiO_3$, $ZnO$, $B_2O_3$, $Bi_2O_3$, $CeO_2$, $WO_3$, $Ag_2O$, $CuO$, $BaO$, $SiO_2$, and $MnO$ as in column A of Table 1. Preferred embodiments are found in columns B and C of Table 1. Throughout the specification and appended claims, it is presumed that each numerical value is preceded by the word "about," unless specifically stated otherwise. "About" does not apply to a metal portion selected from the group consisting of silver, palladium, mixtures thereof and alloys thereof comprising at least 80 wt % silver, and less than 20 wt % palladium.

TABLE 1

Formulations of dielectric compositions for Embodiments A-C.

| Oxides wt % | A | B | C |
|---|---|---|---|
| $BaTiO_3$ | 85-98 | 90-97 | 90.5-96.5 |
| $ZnO$ | 0.3-2.5 | 0.5-2 | 0.7-1.7 |
| $B_2O_3$ | 0.05-1 | 0.1-0.8 | 0.15-0.4 |
| $Bi_2O_3$ | 1-8 | 1.5-6 | 2-5 |
| $CeO_2$ | 0.05-1.5 | 0.1-1 | 0.2-0.7 |
| $WO_3$ | 0.01-2 | 0.2-1.7 | 0.4-1.4 |
| $Ag_2O$ | 0-2 | | |
| $CuO$ | 0.01-0.5 | 0.05-0.35 | 0.05-0.25 |

TABLE 1-continued

Formulations of dielectric compositions for Embodiments A-C.

| Oxides wt % | A | B | C |
|---|---|---|---|
| BaO | 0-1 | | |
| $SiO_2$ | 0-0.5 | | |
| MnO | 0.01-0.5 | 0.03-0.3 | 0.04-0.2 |

In the embodiments of Table 1, the use of $Ag_2O$, BaO, and $SiO_2$ are all optional, as indicated by a lower bound of zero in column A, and blanks in columns B and C. When $Ag_2O$ is used, most broadly it may be present in an amount not exceeding about 2 wt % of the total oxide content, preferably about 0.05 to about 0.5 wt %, and more preferably about 0.1 to about 0.25 wt %. When BaO is used (providing additional Ba in excess of that present in the majority $BaTiO_3$), it is present most broadly in amount not exceeding 1 wt %, preferably 0.05 to about 0.5 wt %, and more preferably 0.1 to about 0.25 wt %. When $SiO_2$ is used, it is present in an amount not exceeding about 0.5 wt %, preferably 0.01 to about 0.25 wt %, and more preferably about 0.02 to about 0.2 wt %. It is understood that all dielectric formulations herein, i.e., in Tables 1, 2, 3, 4, 9, and 12 are given as a blend of ingredients prior to firing.

In a second embodiment, which includes $Nd_2O_3$ and $TiO_2$, the dielectric composition of the present invention comprises, prior to firing, a blend of the oxides of $BaTiO_3$, ZnO, $B_2O_3$, $Bi_2O_3$, $CeO_2$, $WO_3$, $Nd_2O_3$, $TiO_2$, $Ag_2O$, CuO, and MnO. Weight percent of each oxide ingredient is shown in Table 2. A broad formulation is in column D, while preferred embodiments appear in columns E and F.

TABLE 2

Formulations of dielectric compositions including $Nd_2O_3$ and $TiO_2$.

| Oxides wt % | D | E | F |
|---|---|---|---|
| $BaTiO_3$ | 85-98 | 92-97 | 93.5-96.5 |
| ZnO | 0.2-2 | 0.5-1.5 | 0.6-1.2 |
| $B_2O_3$ | 0.1-1 | 0.15-0.7 | 0.2-0.5 |
| $Bi_2O_3$ | 1-4 | 1.7-3.3 | 2-3 |
| $CeO_2$ | 0.1-1 | 0.2-0.7 | 0.25-0.6 |
| $WO_3$ | 0.1-1.5 | 0.4-1.2 | 0.5-1 |
| $Nd_2O_3$ | 0.05-0.5 | 0.05-0.3 | 0.1-0.25 |
| $TiO_2$ | 0.01-0.5 | 0.05-0.3 | 0.08-0.2 |
| $Ag_2O$ | 0-2.5 | | |
| CuO | 0.01-1.5 | 0.015-0.7 | 0.02-0.06 |
| MnO | 0.01-0.5 | 0.02-0.07 | 0.03-0.06 |

In the embodiments of Table 2, the use of $Ag_2O$ is optional, as indicated by a lower bound of zero in column D, and blanks in columns E and F. When $Ag_2O$ is used, most broadly it may be present in an amount not exceeding about 2.5 wt % of the total oxide content, preferably about 0.01 to about 2.5 wt %, more preferably about 0.05 to about 0.5 wt %, and still more preferably about 0.1 to about 0.25 wt %.

In a third embodiment, which includes NiO, $Nb_2O_5$, and $BaSO_4$, the dielectric composition of the present invention comprises, prior to firing, a blend of $BaTiO_3$, ZnO, $B_2O_3$, NiO, $Nb_2O_5$, $Bi_2O_3$, $CeO_2$, $WO_3$, $Ag_2O$, CuO, $BaSO_4$, and MnO. The formulations of these embodiments are shown in Table 3, with the broad formulation in column G, and preferred embodiments in columns H and J.

TABLE 3

Formulations of dielectric compositions including NiO, $Nb_2O_5$, and $BaSO_4$.

| Oxides wt % | G | H | J |
|---|---|---|---|
| $BaTiO_3$ | 85-98 | 92-96 | 93-95 |
| ZnO | 0.5-2 | 1-2 | 1-1.5 |
| $B_2O_3$ | 0.1-1.5 | 0.2-0.6 | 0.3-0.5 |
| NiO | 0.05-0.5 | 0.1-0.4 | 0.15-0.35 |
| $Nb_2O_5$ | 0.1-1 | 0.2-0.7 | 0.3-0.5 |
| $Bi_2O_3$ | 0.5-3 | 1.5-2.5 | 1.7-2.3 |
| $CeO_2$ | 0.1-0.5 | 0.2-0.45 | 0.25-0.35 |
| $WO_3$ | 0.2-2 | 0.3-1 | 0.5-0.8 |
| $Ag_2O$ | 0-0.5 | | |
| CuO | 0.01-1.5 | 0.02-0.4 | 0.02-0.2 |
| $BaSO_4$ | 0.05-0.5 | 0.1-0.3 | 0.12-0.25 |
| MnO | 0.01-0.5 | 0.03-0.35 | 0.04-0.2 |

In the embodiments of Table 3, the use of $Ag_2O$ is optional, as indicated by a lower bound of zero in column G, and blanks in columns H and J. When $Ag_2O$ is used, most broadly it may be present in an amount not exceeding about 0.5 wt %, preferably about 0.01 to about 0.5 wt %, more preferably about 0.01 to about 0.25 wt %, and still more preferably about 0.05 to about 0.2 wt % of the total oxide content.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

The present invention provides a dielectric composition system that can be used to make ceramic multilayer capacitors compatible with internal electrodes containing at least 80 wt % Ag and less than 20 wt % Pd, either as mixtures or as alloys of the metals. The dielectric materials herein and capacitors made therefrom are devoid of lead and cadmium in any form. The capacitors may be formed from the dielectric composition of the present invention to exhibit a stable dielectric constant with a small dielectric loss and also a stable dielectric constant with a small dielectric loss when a DC bias voltage is applied.

The dielectric composition of the present invention comprises a uniform dense microstructure of grains having an average diameter of about 0.5 to about 3 microns. A uniform and dense grain microstructure is critical in achieving high reliability multilayer capacitors having dielectric layers thinner than 5 microns.

In a first embodiment, the dielectric composition of the present invention comprises, prior to firing, a blend of the oxides of $BaTiO_3$, ZnO, $B_2O_3$, $Bi_2O_3$, $CeO_2$, $WO_3$, $Ag_2O$, CuO, BaO, $SiO_2$, and MnO as in column A of Table 1. Preferred embodiments are found in columns B and C of Table 1. Throughout the specification and appended claims, it is presumed that each numerical value is preceded by the word "about," unless specifically stated otherwise. "About" does not apply to a metal portion selected from the group consisting of silver, palladium, mixtures thereof and alloys thereof comprising at least 80 wt % silver, and less than 20 wt % palladium.

TABLE 1

(repeated).
Formulations of dielectric compositions for Embodiments A-C.

| Oxides wt % | A | B | C |
|---|---|---|---|
| $BaTiO_3$ | 85-98 | 90-97 | 90.5-96.5 |
| ZnO | 0.3-2.5 | 0.5-2 | 0.7-1.7 |
| $B_2O_3$ | 0.05-1 | 0.1-0.8 | 0.15-0.4 |
| $Bi_2O_3$ | 1-8 | 1.5-6 | 2-5 |
| $CeO_2$ | 0.05-1.5 | 0.1-1 | 0.2-0.7 |
| $WO_3$ | 0.01-2 | 0.2-1.7 | 0.4-1.4 |
| $Ag_2O$ | 0-2 | | |
| CuO | 0.01-0.5 | 0.05-0.35 | 0.05-0.25 |
| BaO | 0-1 | | |
| $SiO_2$ | 0-0.5 | | |
| MnO | 0.01-0.5 | 0.03-0.3 | 0.04-0.2 |

In the embodiments of Table 1, the use of $Ag_2O$, BaO, and $SiO_2$ are all optional, as indicated by a lower bound of zero in column A, and blanks in columns B and C. When $Ag_2O$ is used, most broadly it may be present in an amount not exceeding about 2 wt % of the total oxide content, preferably about 0.05 to about 0.5 wt %, and more preferably about 0.1 to about 0.25 wt %. When BaO is used (providing additional Ba in excess of that present in the majority $BaTiO_3$), it is present most broadly in amount not exceeding 1 wt %, preferably 0.05 to about 0.5 wt %, and more preferably 0.1 to about 0.25 wt %. When $SiO_2$ is used, it is present in an amount not exceeding about 0.5 wt %, preferably 0.01 to about 0.25 wt %, and more preferably about 0.02 to about 0.2 wt %. It is understood that all dielectric formulations herein, i.e., in Tables 1, 2, 3, 7, 12, and 15 are given as a blend of ingredients prior to firing.

In a second embodiment, which includes $Nd_2O_3$ and $TiO_2$, the dielectric composition of the present invention comprises, prior to firing, a blend of the oxides of $BaTiO_3$, ZnO, $B_2O_3$, $Bi_2O_3$, $CeO_2$, $WO_3$, $Nd_2O_3$, $TiO_2$, $Ag_2O$, CuO, and MnO. Weight percent of each oxide ingredient is shown in Table 2. A broad formulation is in column D, while preferred embodiments appear in columns E and F.

TABLE 2

(repeated).
Formulations of dielectric compositions including $Nd_2O_3$ and $TiO_2$.

| Oxides wt % | D | E | F |
|---|---|---|---|
| $BaTiO_3$ | 85-98 | 92-97 | 93.5-96.5 |
| ZnO | 0.2-2 | 0.5-1.5 | 0.6-1.2 |
| $B_2O_3$ | 0.1-1 | 0.15-0.7 | 0.2-0.5 |
| $Bi_2O_3$ | 1-4 | 1.7-3.3 | 2-3 |
| $CeO_2$ | 0.1-1 | 0.2-0.7 | 0.25-0.6 |
| $WO_3$ | 0.1-1.5 | 0.4-1.2 | 0.5-1 |
| $Nd_2O_3$ | 0.05-0.5 | 0.05-0.3 | 0.1-0.25 |
| $TiO_2$ | 0.01-0.5 | 0.05-0.3 | 0.08-0.2 |
| $Ag_2O$ | 0-2.5 | | |
| CuO | 0.01-1.5 | 0.015-0.7 | 0.02-0.06 |
| MnO | 0.01-0.5 | 0.02-0.07 | 0.03-0.06 |

In the embodiments of Table 2, the use of $Ag_2O$ is optional, as indicated by a lower bound of zero in column D, and blanks in columns E and F. When $Ag_2O$ is used, most broadly it may be present in an amount not exceeding about 2.5 wt % of the total oxide content, preferably about 0.01 to about 2.5 wt %, more preferably about 0.05 to about 0.5 wt %, and still more preferably about 0.1 to about 0.25 wt %.

In a third embodiment, which includes NiO, $Nb_2O_5$, and $BaSO_4$, the dielectric composition of the present invention comprises, prior to firing, a blend of $BaTiO_3$, ZnO, $B_2O_3$, NiO, $Nb_2O_5$, $Bi_2O_3$, $CeO_2$, $WO_3$, $Ag_2O$, CuO, $BaSO_4$, and MnO. The formulations of these embodiments are shown in Table 3, with the broad formulation in column G, and preferred embodiments in columns H and J.

TABLE 3

(repeated).
Formulations of dielectric compositions
including NiO, $Nb_2O_5$, and $BaSO_4$.

| Oxides wt % | G | H | J |
|---|---|---|---|
| $BaTiO_3$ | 85-98 | 92-96 | 93-95 |
| ZnO | 0.5-2 | 1-2 | 1-1.5 |
| $B_2O_3$ | 0.1-1.5 | 0.2-0.6 | 0.3-0.5 |
| NiO | 0.05-0.5 | 0.1-0.4 | 0.15-0.35 |
| $Nb_2O_5$ | 0.1-1 | 0.2-0.7 | 0.3-0.5 |
| $Bi_2O_3$ | 0.5-3 | 1.5-2.5 | 1.7-2.3 |
| $CeO_2$ | 0.1-0.5 | 0.2-0.45 | 0.25-0.35 |
| $WO_3$ | 0.2-2 | 0.3-1 | 0.5-0.8 |
| $Ag_2O$ | 0-0.5 | | |
| CuO | 0.01-1.5 | 0.02-0.4 | 0.02-0.2 |
| $BaSO_4$ | 0.05-0.5 | 0.1-0.3 | 0.12-0.25 |
| MnO | 0.01-0.5 | 0.03-0.35 | 0.04-0.2 |

In the embodiments of Table 3, the use of $Ag_2O$ is optional, as indicated by a lower bound of zero in column G, and blanks in columns H and J. When $Ag_2O$ is used, most broadly it may be present in an amount not exceeding about 0.5 wt %, preferably about 0.01 to about 0.5 wt %, more preferably about 0.01 to about 0.25 wt %, and still more preferably about 0.05 to about 0.2 wt % of the total oxide content.

Multilayer chip capacitors are fabricated by alternately stacking dielectric layers and internal electrodes to form green chips. The internal electrodes of interest herein are comprised of metals including such as mixtures or alloys of silver and palladium; platinum, mixtures or alloys of platinum and palladium; and mixtures or alloys of platinum, palladium and gold. The dielectric composition that forms the dielectric layers is produced by wet milling the components of the dielectric with an organic vehicle system. The dielectric composition is deposited on a carrier film, such as polyester, polypropylene, or a belt, such as stainless steel, paper, or a substrate such as alumina or glass, coating the film, and forming sheets, which are alternately stacked with electrodes to form the green chips.

Preferred embodiments include internal electrodes including a metal component comprising at least 80% Ag and less than 20% Pd, about 85% Ag/15% Pd, about 90Ag %/10% Pd, or about 95% Ag/5% Pd, about 99% Ag/1% Pd, up to 100% Ag and values in between, (percentages by weight) without sacrificing capacitor performance.

Figure 1:
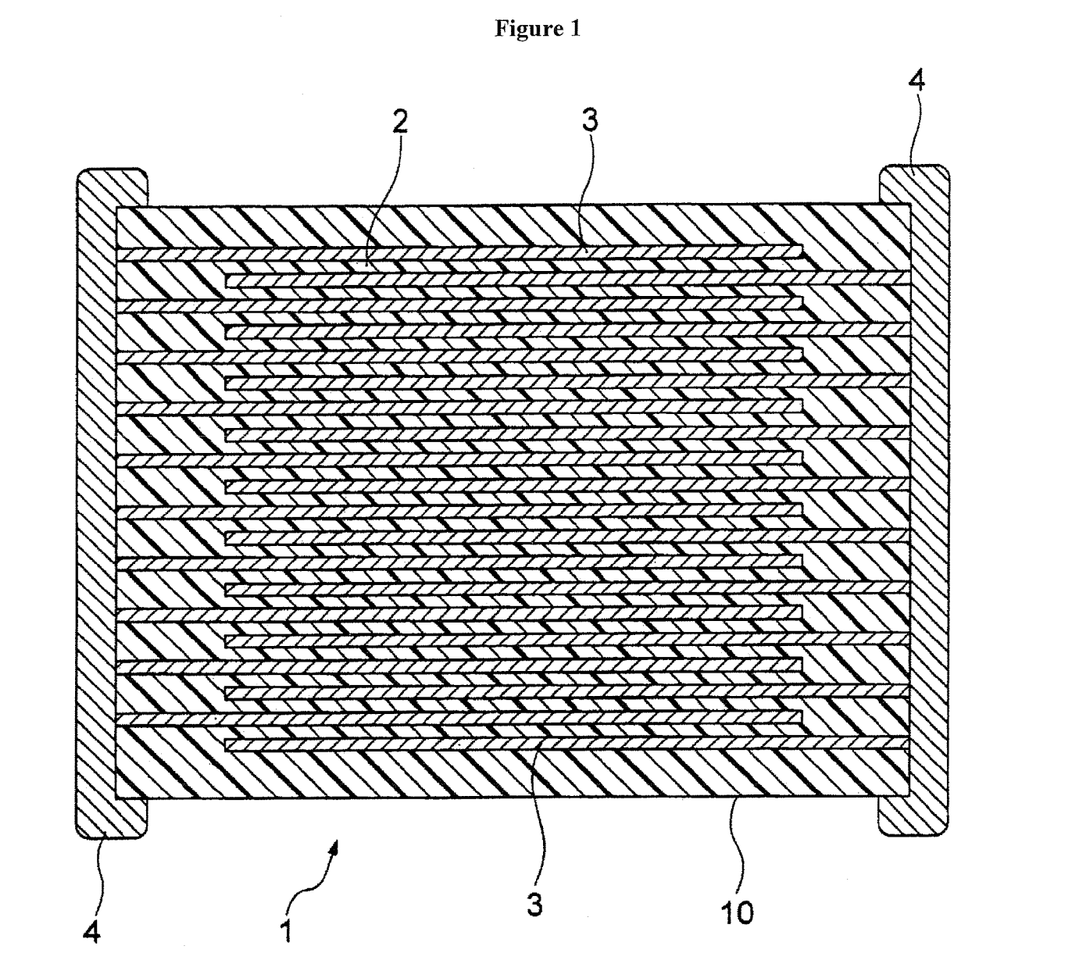
FIG. 1 is a cross-sectional view of a multilayer ceramic chip capacitor according to a preferred embodiment of the invention.

After the green chips are formed, the organic vehicle is removed by heating to a temperature less of about 350° C. in an air atmosphere. Once the vehicle is removed, the green chips are then fired at about 900° C. to about 1000° C. in air in a batch kiln or in a tunnel kiln. Various heating profiles may be used both for removing the binder and for firing the chip. The configuration of multilayer ceramic capacitors is well known in the art. With reference to FIG. 1, an exemplary structure of a multilayer ceramic chip capacitor 1 is shown. External electrodes 4 of the capacitor 1 are disposed on side surfaces of the capacitor chip 1 and in electrical connection with internal electrode layers 3. The capacitor chip 1 has a plurality of alternately stacked dielectric layers 2. The shape of the capacitor chip 1 is not critical although it is often rectangular shaped. Also, the size is not critical and the chip may have appropriate dimensions in accordance with a particular application, typically in the range of 1.0 to 5.6 mm×0.5 to 5.0 mm×0.5 to 1.9 mm. The internal electrode layers 3 are stacked such that at opposite ends they are alternately exposed at opposite side surfaces of the chip 1. That is, the internal electrode layers 3 of one group are exposed at one side surface of the chip 1 and the internal electrode layers 3 of another group are exposed at the opposite side surface of the chip 1. One external electrode 4 is applied to one side surface of the capacitor chip 1 in electrical contact with the internal electrode layers 3 of the one group, and the other external electrode 4 is applied to the opposite side surface of the chip 1 in electrical contact with the internal electrode layers 3 of the other group.

It is well known to those who are familiar with the art that any or all of the above oxides (except $BaTiO_3$) can be pre-blended to form a pre-mix or pre-reacted to form an intermediate compound. The effect will be the same so long as the final composition, expressed as oxides, is the same. It is apparent to those skilled in the art that metal salts such as carbonates, nitrates, hydroxides, oxalates, acetates, and organometallic compounds have the same effect, so long as the desired metal ion is provided in the desired quantity.

Other compounds may be present in the dielectric material provided that the other compound does not adversely affect dielectric properties. Such compounds are usually found in the raw materials as impurities.

The dielectric compositions herein possess fine crystal grains that typically have a mean size of 0.5-3 microns, with a grain size of less than 0.7 micron being preferred. Each dielectric layer has a thickness of up to about 50 microns. Preferably, the thickness of each dielectric layer is from about 0.5 microns to about 50 microns. More preferably, the thickness of each dielectric layer is from about 2 microns to about 10 microns. The compositions herein may be employed to make multilayer ceramic chip capacitors having thin dielectric layers to ensure minimal degradation of capacitance over the service life.

The number of dielectric layers stacked in a chip capacitor is generally from about 2 to about 800, and more preferably from about 3 to about 400. The multilayer ceramic chip capacitor of the invention generally is fabricated by forming a green chip by conventional printing and sheeting methods using pastes, and firing the chip. After firing, the chip is tumbled dry in a medium such as alumina or silica to round off corners. A conductive paste, including silver, or mixtures or alloys of silver and palladium, for example, is then applied to both ends to connect the exposed inner electrodes together to make terminations. The chip is then termination fired at about 800° C. in air to sinter the conductor (e.g., silver) into a solid conduction pad at both ends, to form a multilayer capacitor. The terminations are external electrodes 4 as shown in FIG. 1.

Dielectric Pastes. A paste for forming the dielectric layers can be obtained by mixing an organic vehicle with a raw dielectric material, as disclosed herein. Also useful are precursor compounds that convert to such oxides and composite oxides upon firing, as stated hereinabove. The dielectric material is obtained by selecting compounds containing these oxides, or precursors of these oxides, and mixing them in the appropriate proportions. The proportion of such compounds in the raw dielectric material is determined such that after firing, the desired dielectric layer composition may be obtained. The raw dielectric material is generally used in powder form having a mean particle size of about 0.1 to about 3 microns, and more preferably about 1 micron or less.

Organic Vehicle. The organic vehicle is a binder in an organic solvent or a binder in water. The binder used herein is not critical; conventional binders such as ethyl cellulose, polyvinyl butanol, ethyl cellulose, and hydroxypropyl cellulose, and combinations thereof are appropriate in combination with a solvent. The organic solvent is also not critical and may be selected in accordance with a particular application method (i.e., printing or sheeting), from conventional organic solvents such as butyl carbitol, acetone, toluene, ethanol, diethylene glycol butyl ether; 2,2,4-trimethyl pentanediol monoisobutyrate (Texanol™); alpha-terpineol; beta-terpineol; gamma terpineol; tridecyl alcohol; diethylene glycol ethyl ether (Carbitol™), diethylene glycol butyl ether (Butyl Carbitol™) and propylene glycol; and blends thereof, Products sold under the Texanol® trademark are available from Eastman Chemical Company, Kingsport, Tenn.; those sold under the Dowanol® and Carbitol® trademarks are available from Dow Chemical Co., Midland, Mich. Alternatively, the binder could be selected from polyvinyl alcohol (PVA), polyvinyl acetate (PVAC) in combination with water.

No particular limit is imposed on the organic vehicle content of the respective pastes (dielectric or electrode pastes). Often the paste contains about 1 to 5 wt % of the binder and about 10 to 50 wt % of the organic solvent, with the balance being either the metal component (for an electrode) or a dielectric component (for a dielectric layer). If desired, the respective pastes may contain up to about 10 wt % of other additives such as dispersants, plasticizers, and insulating compounds.

Internal Electrode. A paste for forming internal electrode layers is obtained by mixing an electro-conductive material with an organic vehicle. The conductive material used herein includes conductors such as silver and palladium metals and their alloys as mentioned herein and various compounds which convert into such conductors upon firing, for example, oxides, organometallic compounds and resinates. An example of a suitable Ag/Pd paste is EL44-010 Ag/Pd paste, which contains 90 wt % Ag and 10 wt % Pd, from Ferro Corporation.

With reference to FIG. 1, the conductor that forms the internal electrode layers 3 is usually a silver/palladium mixture or alloy. The thickness of the internal electrode layers may be determined to suit a particular application, but the layers are typically up to about 5 microns thick. Preferably, an internal electrode layer has a thickness of about 0.5 to about 3 microns and more preferably about 1 to about 2 microns.

External Electrode. The conductor that forms the external electrodes 4 is usually a Ag or Ag/Pd mixture or alloy of Ag and Pd. The thickness of the external electrode layers may be determined to suit a particular application, but the layers are typically up about 10 to about 50 microns thick, preferably about 20 to about 40 microns thick. Paste for forming external electrodes is prepared by the same method as for the internal electrodes.

Formation of Green Chips. A green chip then may be prepared from the dielectric layer-forming paste and the internal electrode layer-forming paste. In the case of a printing method, a green chip is prepared by alternately printing the pastes onto a substrate of a polyester film, (e.g., polyethylene terephthalate (PET)), in laminar form, cutting the laminar stack to a predetermined shape and separating it from the substrate. Also useful is a sheeting method wherein a green chip is prepared by forming green sheets from the dielectric layer-forming paste, printing the internal electrode layer-forming paste on the respective green sheets, and stacking the printed green sheets.

Drying. The organic vehicle may be removed ("drying") under conventional conditions, by heating at a rate of 0.01° C. to 20° C./hour, more preferably about 0.03-0.1° C./hour, with a hold temperature of about 150° C.-350° C., more preferably about 250° C., and a hold time of about 30-700 minutes, more preferably about 200-300 minutes in an air atmosphere. After the organic vehicle is removed from the green chip, it is fired. The chip may be allowed to cool to room temperature before firing or fired directly after the organic vehicle is removed, without cooling.

Firing. The dried green chip is then fired in air, at a temperature from about 900° to about 1000° C. The dielectric compositions herein require no more than 1000° C. to effect full fusion of the dielectric and sintering of the electrodes. The firing temperature is held for about two hours to enhance densification. Lower hold temperatures provide insufficient densification whereas higher hold temperatures can lead to very large grains. The firing temperature ramp is typically 5° C. per minute, although other ramp rates (per minute) of 1° C., 2° C., 10° C., 15° C. or 20° C. can be used.

The organic vehicle removal and firing may be carried out either continuously or separately. If continuously, the process includes organic vehicle removal, raising the temperature to the firing temperature without cooling, holding at that temperature for a specified time and cooling afterwards. If separately, after organic vehicle removal and cooling down, the temperature of the chip is raised to the sintering temperature. The resulting chip may be polished at end faces by barrel tumbling and sand blasting, for example, before the external electrode-forming paste is printed or transferred and fired to form external electrodes (terminations). Firing of the external electrode-forming paste may be carried out in air at about 600° C. to 800° C., for about 10 minutes to about 1 hour. If necessary, pads are formed on the external electrodes by plating or other methods known in the art. The multilayer ceramic chip capacitors of the invention can be mounted on printed circuit boards, for example, by soldering.

In general, the dielectric compositions herein can be used to make a multilayer ceramic chip capacitor having a dielectric constant greater than about 2000, a dissipation factor less than about 2%, meeting X7R and BX standards, wherein the dielectric comprises a fired collection of alternately stacked layers of the any dielectric material described elsewhere herein and layers of an internal electrode material selected from the group consisting of silver, palladium, and mixtures thereof and alloys thereof.

Further, the invention also embraces a method of forming an electronic component comprising: alternately applying layers of any dielectric material described elsewhere herein and layers of an internal electrode material comprising a metal portion selected from the group consisting of silver, palladium, alloys thereof, and mixtures thereof, onto a substrate to form a stack, and firing the stack at a temperature not exceeding 1000° C. such that the dielectric fuses and the metal sinters.

EXAMPLES

Multilayer ceramic capacitors with Ag/Pd electrodes including at least 80 wt % silver, 20 active layers, each layer having a thickness of 5 to 15 microns were prepared and sintered in air at 900° C. to 1000° C. Physical and electrical measurements were carried out. The fired chips exhibit a dielectric constant over 2000, DF less than 4.00% at 1 KHz, TCC of less than ±15% from −55° C. to +125° C., TCVC of less than ±25% when a DC bias voltage of about 1.5 V/micron is applied, RC greater than 1000 seconds at 25° C., and RC greater than 20 seconds at 125° C. The dielectric breakdown voltage exceeds 40 V/micron. The following exemplary compositions are provided to illustrate preferred aspects of the invention and are not intended to limit the scope of the invention.

Examples 1-4

Dielectric compositions were formed by mixing, blending, and/or milling in water appropriate amounts (in weight percent) of the oxides as shown in Table 4.

TABLE 4

Compositions of Examples 1-4.

| Example | $BaTiO_3$ | ZnO | $B_2O_3$ | $Bi_2O_3$ | $CeO_2$ | $WO_3$ | $Ag_2O$ | CuO | BaO | $SiO_2$ | MnO | Total |
|---|---|---|---|---|---|---|---|---|---|---|---|---|
| 1 | 96.237 | 0.730 | 0.170 | 2.080 | 0.200 | 0.403 | -0- | 0.060 | 0.057 | 0.023 | 0.040 | 100 |
| 2 | 95.952 | 0.730 | 0.171 | 2.080 | 0.294 | 0.594 | -0- | 0.094 | -0- | -0- | 0.084 | 100 |
| 3 | 95.878 | 0.657 | 0.295 | 2.077 | 0.294 | 0.593 | 0.146 | 0.020 | -0- | -0- | 0.040 | 100 |
| 4 | 90.895 | 1.662 | 0.388 | 4.737 | 0.670 | 1.354 | -0- | 0.215 | -0- | -0- | 0.078 | 100 |

After milling, the powders were dried and pulverized. The final powders had average particle sizes of 0.4-0.9 micron. One hundred grams of each of the above powders was then added with 28.8 grams of an organic vehicle comprising polyvinyl butanol, toluene, and methanol, and wet milled for 24 hours to prepare a slurry for tape casting. The wet slurry was coated on a polyester film to form dielectric green tapes. The thickness of the dielectric green tapes was from about 20 to about 30 microns depending on the specific testing to be performed on them. Electrodes of 90% Ag/10% Pd or 95% Ag/5% Pd were printed onto the dried green dielectric tape by conventional screen-printing methods using conventional Ag/Pd pastes. A total of 20 sheets, plus top and bottom cover layers without electrode printing, were stacked and bonded under a pressure of 5100 psi [~347 atmospheres] and a temperature of 130° F. to form a green chip. After dicing to a suitable dimension so that, after sintering and shrinkage, (which is typically from 15% to 20% in both length and width directions), the chip dimension is about 0.120"(L)×0.060" (W) (EIA1206 size), the green chip was heated to remove the organic vehicle in accordance with the burn-out cycle of Table 5.

TABLE 5

Binder Removal Conditions.

| Stage | Temp (° C.) | Duration (hours) | Atmosphere |
|---|---|---|---|
| Ramp from room temp | 255 | 20 | Air |
| Soak | 255 | 6 | Air |
| Cool | 25 | 4 | Air |

Upon cooling to room temperature, the chips using the powders of Table 4 (Examples 1-4) were fired under the conditions set forth in Table 6 in a Nabertherm batch kiln in air to obtain a multilayer capacitor chips.

TABLE 6

Firing Conditions for Examples 1-4.

| Stage | Temp (° C.) | Duration (hours) | Atmosphere |
|---|---|---|---|
| Ramp | 900-1000 | 4-6 | Air |
| Soak | 900-1000 | 4-6 | Air |
| Cool | 25 | 4-6 | Air |

For all examples, chips were placed on a $ZrO_2$ setter or in a closed $Al_2O_3$ crucible and sintered in air at a temperature from 900° C. to 950° C. Chips thus obtained were corner rounded by tumbling. An external electrode forming Ag paste available as TK33008 from Ferro Corporation of Cleveland, Ohio was applied to the end faces and fired in air at 720° C. for about 15 minutes to form external electrodes. The multilayer capacitor thus processed had dimensions of about 0.120" (L)×0.06" (W) (EIA1206 size) with variable height. The dielectric layers were 10 to 15 microns thick, and the internal silver/palladium electrode layers were about 1.5 microns thick. A value such as "920/6" means the firing was carried out at a hold temperature of 920° C. for six hours.

These multilayer chip capacitors were then measured for their electrical properties of Capacitance (Cap.), Dissipation Factor (DF), Temperature Characteristics (TCC), at a test frequency of 1 KHz and a test voltage of 1.0 V RMS. Insulation Resistance (IR), and Breakdown Voltage (BDV) were also measured. From physical dimensions of the chips and their active dielectric thickness, and number of active dielectric layers, the Dielectric Constant (K), Insulation Resistance×Capacitance Constant (RC), and Breakdown Strength of the composition can be calculated. The results are shown in Table 7.

The exemplary chips made from the compositions of Examples 1-4 have very high dielectric constants, low DF, dense microstructure, and high breakdown strength. The TCC meets the X7R standard and the RC at 25° C. and 125° C. all exceed EIA specifications.

Chips of Example 2 were also measured for TCC with DC bias voltage applied. Results in Table 8 show very stable properties. The chips meet BX characteristics: TCVC within ±25% when about 1.6 volts/micron or less DC bias voltage is applied.

TABLE 8

TCC of Example 2 with DC Bias Voltage

| Firing (° C./Hr.) | Thickness (Micron) | DC Voltage (Volt) | Voltage Stress (Volt/Micron) | TCVC at −55° C. (%) | TCVC at 85° C. (%) | TCVC at 125° C. (%) |
|---|---|---|---|---|---|---|
| 920/6 | 9.5 | 0 | 0 | −11.5 | −7.7 | −7.5 |
|  |  | 25 | 2.6 | −31.9 | −32.5 | −32.9 |
|  |  | 50 | 5.3 | −62.2 | −58.4 | −55.3 |

Examples 5-11

Dielectric compositions were formed in exactly the same manner as disclosed in Examples 1-4. The compositions are described in Table 9.

TABLE 7

Summary of Electrical Properties of Examples 1-4

| Example | Firing (° C./Hr.) | Thickness (μm) | Capacitance (nF) | DF (%) | K | TCC −55° C. | TCC 85° C. | TCC 125° C. | RC 25° C. (sec.) | RC 125° C. (sec.) | Breakdown (V/μm) |
|---|---|---|---|---|---|---|---|---|---|---|---|
| 1 | 920/6 | 9.9 | 101.6 | 2.09 | 2558 | −13.3 | −7.2 | −5.0 | 3952 | 78 | 101 |
| 1 | 940/4 | 9.4 | 102.8 | 2.11 | 2650 | −12.5 | −7.8 | −6.3 | 3967 | 61 | 132 |
| 2 | 920/6 | 9.5 | 104.8 | 1.90 | 2880 | −11.5 | −7.7 | −7.5 | 5903 | 153 | 110 |
| 2 | 940/2 | 9.4 | 108.7 | 1.87 | 2719 | −10.3 | −11.7 | −14.2 | 4728 | 92 | 112 |
| 3 | 920/6 | 11.7 | 77.0 | 2.01 | 2317 | −15.0 | −0.9 | 3.8 | 4447 | 384 | 93 |
| 3 | 940/4 | 11.0 | 78.8 | 2.02 | 2369 | −14.7 | −2.1 | 2.8 | 4611 | 179 | 118 |
| 4 | 930/6 | 9.7 | 112.8 | 1.96 | 2873 | −8.2 | −9.6 | −9.1 | 3069 | 40 | 94 |
| 4 | 940/4 | 9.2 | 111.5 | 1.93 | 2530 | −7.2 | −9.7 | −7.3 | 2530 | 22 | 104 |

K = Capacitance × (1/8.854E−14) × (Thickness/(L × W)) × (1/N)

L = Length of active electrode (cm)

RC = Capacitance (nF) × Insulation Resistance (G-Ohm)

N = Number of active dielectric layers

W = Width of active electrode (cm)

TABLE 9

Compositions of Examples 5-11.

| Example | BaTiO$_3$ | ZnO | B$_2$O$_3$ | Bi$_2$O$_3$ | CeO$_2$ | WO$_3$ | Nd$_2$O$_3$ | TiO$_2$ | Ag$_2$O | CuO | MnO | Total |
|---|---|---|---|---|---|---|---|---|---|---|---|---|
| 5 | 96.019 | 0.656 | 0.221 | 1.971 | 0.279 | 0.563 | 0.102 | 0.060 | 0.069 | 0.019 | 0.040 | 100 |
| 6 | 95.956 | 0.668 | 0.224 | 2.005 | 0.284 | 0.572 | 0.103 | 0.061 | 0.070 | 0.019 | 0.036 | 100 |
| 7 | 95.892 | 0.692 | 0.162 | 1.973 | 0.279 | 0.564 | 0.203 | 0.121 | -0- | 0.057 | 0.057 | 100 |
| 8 | 95.757 | 0.786 | 0.233 | 2.077 | 0.294 | 0.593 | 0.107 | 0.063 | -0- | 0.040 | 0.050 | 100 |
| 9 | 94.043 | 0.987 | 0.332 | 2.959 | 0.419 | 0.845 | 0.153 | 0.091 | 0.103 | 0.029 | 0.040 | 100 |
| 10 | 94.020 | 1.001 | 0.233 | 2.853 | 0.403 | 0.815 | 0.294 | 0.174 | 0.146 | 0.020 | 0.040 | 100 |
| 11 | 93.985 | 0.995 | 0.334 | 2.986 | 0.423 | 0.853 | 0.154 | 0.091 | 0.105 | 0.029 | 0.044 | 100 |

The powders were processed and tested in the same manner as in Examples 1-4. Firing conditions as well as electrical properties are summarized in Table 10. The exemplary chips made from compositions of Examples 5-11 have very high dielectric constants, low DF, dense microstructure, and high breakdown voltages. The TCC meets the X7R standard and the IR at 25° C. and 125° C. all exceed EIA specifications.

Example 12

A dielectric composition was formed in exactly the same manner as disclosed in Examples 1-4. The composition is described in Table 12.

TABLE 10

Summary of Electrical Properties of Examples 5-11.

| Example | Firing (° C./Hr.) | Thickness (micron) | Capacitance (nF) | DF (%) | Calculated K | TCC −55° C. | TCC 85° C. | TCC 125° C. | RC 25° C. (sec.) | RC 125° C. (sec.) | Breakdown (V/micron) |
|---|---|---|---|---|---|---|---|---|---|---|---|
| 5 | 920/6 | 10.7 | 87.3 | 2.01 | 2431 | −12.5 | −3.9 | −0.6 | 3992 | 306 | 44 |
| 5 | 940/4 | 11.1 | 91.6 | 1.83 | 2642 | −10.4 | −4.5 | −1.7 | 3372 | 152 | 66 |
| 6 | 930/4 | 10.6 | 85.4 | 2.07 | 2409 | −15.4 | −6.0 | −5.5 | 1457 | 31 | 83 |
| 6 | 940/4 | 10.5 | 79.4 | 1.92 | 2197 | −13.8 | −5.2 | −4.3 | 1693 | 29 | 104 |
| 7 | 920/6 | 9.9 | 88.9 | 1.71 | 2401 | −8.2 | −7.9 | −7.9 | 2908 | 61 | 86 |
| 7 | 940/4 | 9.1 | 92.7 | 1.76 | 2316 | −7.7 | −10.0 | −10.5 | 2054 | 24 | 99 |
| 8 | 920/6 | 10.6 | 88.3 | 1.93 | 2604 | −11.9 | −5.3 | −1.8 | 3092 | 70 | 93 |
| 8 | 940/4 | 11.0 | 88.6 | 1.89 | 2603 | −9.9 | −5.9 | −3.4 | 2348 | 44 | 94 |
| 9 | 930/6 | 10.3 | 81.3 | 1.89 | 2423 | −14.4 | 1.6 | 6.5 | 9025 | 528 | 105 |
| 9 | 940/4 | 10.5 | 82.7 | 1.86 | 2615 | −13.1 | 0.5 | 5.4 | 7354 | 402 | 92 |
| 10 | 930/6 | 10.0 | 81.6 | 3.93 | 2158 | −16.2 | 1.0 | 6.4 | 472 | 728 | 77 |
| 10 | 940/4 | 9.9 | 78.7 | 3.70 | 2074 | −15.9 | 0.3 | 5.2 | 755 | 684 | 70 |
| 11 | 920/6 | 9.3 | 85.1 | 2.09 | 2046 | −16.9 | 3.3 | 10.9 | 3857 | 1335 | 72 |
| 11 | 940/4 | 9.5 | 91.6 | 2.08 | 2330 | −15.5 | 2.0 | 9.6 | 7643 | 760 | 110 |

Chips of Example 7 were also measured for TCC with DC bias voltage applied. Results in Table 11 show very stable properties. The chips meet BX characteristics: TCVC within ±25% when about 1.6 Volt/micron or less DC bias voltage is applied.

TABLE 11

TCC of Example 7 With DC Bias Voltage

| Firing (° C./Hr.) | Thickness (Micron) | DC Voltage (Volt) | Voltage Stress (Volt/Micron) | TCVC at −55° C. (%) | TCVC at 85° C. (%) | TCVC at 125° C. (%) |
|---|---|---|---|---|---|---|
| 940/4 | 9.1 | 0 | 0 | −7.7 | −10.0 | −10.5 |
| | | 25 | 2.7 | −32.6 | −33.5 | −34.1 |
| | | 50 | 5.5 | −60.3 | −55.6 | −54.5 |

TABLE 12

Composition of Example 12.

| Example | BaTiO$_3$ | ZnO | B$_2$O$_3$ | NiO | Nb$_2$O$_5$ | Bi$_2$O$_3$ | CeO$_2$ | WO$_3$ | Ag$_2$O | CuO | BaSO$_4$ | MnO | Total |
|---|---|---|---|---|---|---|---|---|---|---|---|---|---|
| 12 | 94.318 | 1.380 | 0.408 | 0.210 | 0.318 | 2.106 | 0.297 | 0.602 | 0.148 | 0.020 | 0.153 | 0.040 | 100 |

The powder was processed and tested in the same manner as in Examples 1-4. Firing conditions as well as electrical properties are summarized in Table 13.

TABLE 13

Summary of Electrical Properties of Example 12.

| Ex. | Firing (° C./Hr.) | Thickness (micron) | Capacitance (nF) | DF (%) | Calculated K | TCC −55° C. | TCC 85° C. | TCC 125° C. | RC 25° C. (sec.) | RC 125° C. (sec.) | Breakdown (V/micron) |
|---|---|---|---|---|---|---|---|---|---|---|---|
| 12 | 930/6 | 12.1 | 65.4 | 1.91 | 2075 | −7.0 | −2.9 | 1.2 | 1758 | 77 | 76 |
|  | 940/4 | 10.9 | 66.3 | 1.86 | 2019 | −6.6 | −3.0 | 1.1 | 1293 | 35 | 108 |

The exemplary chips made from the composition of Example 12 have very high dielectric constant, low DF, dense microstructure, and high breakdown voltages. The TCC meets the X7R standard and the IR at 25° C. and 125° C. all exceed EIA specifications.

Chips of the composition of Example 12 were also measured for TCC with DC bias voltage applied. Results are shown in Table 14 shows very stable properties, indicating they meet EIA BX characteristics when about 2.3 volts/micron or less DC bias voltage is applied.

TABLE 14

TCC of Example 12 with DC Bias Voltage.

| Firing (° C./Hr.) | Thickness (Micron) | DC Voltage (Volt) | Voltage Stress (Volt/Micron) | TCVC at −55° C. (%) | TCVC at 85° C. (%) | TCVC at 125° C. (%) |
|---|---|---|---|---|---|---|
| 940/4 | 10.9 | 0 | 0 | −6.6 | −3.0 | 1.1 |
|  |  | 25 | 2.3 | −23.4 | −20.3 | −21.0 |
|  |  | 50 | 4.6 | −45.9 | −42.9 | −43.1 |

Additional advantages and modifications will readily occur to those skilled in the art. Therefore, the invention in its broader aspects is not limited to the specific details and illustrative example shown and described herein. Accordingly, various modifications may be made without departing from the spirit or scope of the general invention concept as defined by the appended claims and their equivalents.

The invention claimed is:

1. A lead-free and cadmium-free ceramic dielectric composition for multilayer ceramic capacitor manufacturing comprising:
   a. about 85 to about 98 wt % BaTiO$_3$,
   b. about 0.3 to about 2.5 wt % ZnO,
   c. about 0.05 to about 1 wt % B$_2$O$_3$,
   d. about 1 to about 8 wt % Bi$_2$O$_3$,
   e. about 0.05 to about 1.5 wt % CeO$_2$,
   f. about 0.01 to about 2 wt % WO$_3$,
   g. about 0.01 to about 0.5 wt % CuO, and
   h. about 0.01 to about 0.5 wt % MnO.

2. The composition of claim 1, comprising:
   a. about 90 to about 97 wt % BaTiO$_3$,
   b. about 0.5 to about 2 wt % ZnO,
   c. about 0.1 to about 0.8 wt % B$_2$O$_3$,
   d. about 1.5 to about 6 wt % Bi$_2$O$_3$,
   e. about 0.1 to about 1 wt % CeO$_2$,
   f. about 0.2 to about 1.7 wt % WO$_3$,
   g. about 0.05 to about 0.35 wt % CuO, and
   h. about 0.03 to about 0.3 wt % MnO.

3. The composition of claim 1, comprising:
   a. about 90.5 to about 96.5 wt % BaTiO$_3$,
   b. about 0.7 to about 1.7 wt % ZnO,
   c. about 0.15 to about 0.4 wt % B$_2$O$_3$,
   d. about 2 to about 5 wt % Bi$_2$O$_3$,
   e. about 0.2 to about 0.7 wt % CeO$_2$,
   f. about 0.4 to about 1.4 wt % WO$_3$,
   g. about 0.05 to about 0.25 wt % CuO, and
   h. about 0.04 to about 0.2 wt % MnO.

4. The composition of claim 1, further comprising Ag$_2$O, wherein the content of Ag$_2$O does not exceed about 2 wt %.

5. The composition of claim 2, further comprising at least one of BaO and SiO$_2$, wherein the content of BaO does not exceed about 1 wt % and the content of SiO$_2$ does not exceed about 0.5 wt %.

6. A lead-free and cadmium-free ceramic dielectric composition for multilayer ceramic capacitor manufacturing comprising:
   a. about 85 to about 98 wt % BaTiO$_3$,
   b. about 0.2 to about 2 wt % ZnO,
   c. about 0.1 to about 1 wt % B$_2$O$_3$,
   d. about 1 to about 4 wt % Bi$_2$O$_3$,
   e. about 0.1 to about 1 wt % CeO$_2$,
   f. about 0.1 to about 1.5 wt % WO$_3$,
   g. about 0.05 to about 0.5 wt % Nd$_2$O$_3$,
   h. about 0.01 to about 0.5 wt % TiO$_2$,
   i. about 0.01 to about 0.5 wt % CuO, and
   j. about 0.01 to about 0.5 wt % MnO.

7. The composition of claim 6, comprising:
   a. about 92 to about 97 wt % BaTiO$_3$,
   b. about 0.5 to about 1.5 wt % ZnO,
   c. about 0.15 to about 0.7 wt % B$_2$O$_3$,
   d. about 1.7 to about 3.3 wt % Bi$_2$O$_3$,
   e. about 0.2 to about 0.7 wt % CeO$_2$,
   f. about 0.4 to about 1.2 wt % WO$_3$,
   g. about 0.05 to about 0.3 wt % Nd$_2$O$_3$, h. about 0.05 to about 0.3 wt % $TiO_2$,
i. about 0.015 to about 0.07 wt % CuO, and
j. about 0.02 to about 0.07 wt % MnO.

8. The composition of claim 6 comprising:
a. about 93.5 to about 96.5 wt % $BaTiO_3$,
b. about 0.6 to about 1.2 wt % ZnO,
c. about 0.2 to about 0.5 wt % $B_2O_3$,
d. about 2 to about 3 wt % $Bi_2O_3$,
e. about 0.25 to about 0.6 wt % $CeO_2$,
f. about 0.5 to about 1 wt % $WO_3$,
g. about 0.1 to about 0.25 wt % $Nd_2O_3$,
h. about 0.08 to about 0.2 wt % $TiO_2$,
i. about 0.02 to about 0.06 wt % CuO, and
j. about 0.03 to about 0.06 wt % MnO.

9. The composition of claim 6 further comprising $Ag_2O$, wherein the content of $Ag_2O$ does not exceed about 2.5 wt %.

10. The composition of claim 7 further comprising about 0.05 to about 0.5 wt % $Ag_2O$.

11. A lead-free and cadmium-free ceramic dielectric composition for multilayer ceramic capacitor manufacturing comprising:
a. about 85 to about 98 wt % $BaTiO_3$,
b. about 0.5 to about 2 wt % ZnO,
c. about 0.1 to about 1.5 wt % $B_2O_3$,
d. about 0.05 to about 0.5 wt % NiO,
e. about 0.1 to about 1 wt % $Nb_2O_5$,
f. about 0.5 to about 3 wt % $Bi_2O_3$,
g. about 0.1 to about 5 wt % $CeO_2$,
h. about 0.2 to about 2 wt % $WO_3$,
i. about 0.01 to about 0.5 wt % CuO,
j. about 0.05 to about 0.5 wt % $BaSO_4$, and
k. about 0.01 to about 0.5 wt % MnO.

12. The composition of claim 11, comprising:
a. about 92 to about 96 wt % $BaTiO_3$,
b. about 1 to about 2 wt % ZnO,
c. about 0.2 to about 0.6 wt % $B_2O_3$,
d. about 0.1 to about 0.4 wt % NiO,
e. about 0.2 to about 0.7 wt % $Nb_2O_5$,
f. about 1.5 to about 2.5 wt % $Bi_2O_3$,
g. about 0.2 to about 0.45 wt % $CeO_2$,
h. about 0.3 to about 1 wt % $WO_3$,
i. about 0.02 to about 0.4 wt % CuO,
j. about 0.1 to about 0.3 wt % $BaSO_4$, and
k. about 0.03 to about 0.35 wt % MnO.

13. The composition of claim 11, comprising:
a. about 93 to about 95 wt % $BaTiO_3$,
b. about 1 to about 1.5 wt % ZnO,
c. about 0.3 to about 0.5 wt % $B_2O_3$,
d. about 0.15 to about 0.35 wt % NiO,
e. about 0.3 to about 0.5 wt % $Nb_2O_5$,
f. about 1.7 to about 2.3 wt % $Bi_2O_3$,
g. about 0.25 to about 0.35 wt % $CeO_2$,
h. about 0.5 to about 0.8 wt % $WO_3$,
i. about 0.02 to about 0.2 wt % CuO,
j. about 0.12 to about 0.25 wt % $BaSO_4$, and
k. about 0.04 to about 0.2 wt % MnO.

14. The composition of claim 11, further comprising $Ag_2O$, wherein the content of $Ag_2O$ does not exceed about 0.5 wt %.

15. The composition of claim 12, further comprising 0.1 to about 0.2 wt % $Ag_2O$.

16. A multilayer ceramic chip capacitor having a dielectric constant greater than about 2000, a dissipation factor less than about 2%, and meeting X7R and BX standards comprising a fired collection of alternately stacked:
a. layers of the dielectric composition of claim 1 and
b. layers of an internal electrode material comprising a metal portion selected from the group consisting of silver, palladium, mixtures thereof and alloys thereof.

17. The capacitor of claim 16 wherein the metal portion comprises at least 80 wt % silver, and less than 20 wt % palladium.

18. A multilayer ceramic chip capacitor having a dielectric constant greater than about 2000, a dissipation factor less than about 2%, meeting X7R and BX standards comprising a fired collection of alternately stacked:
a. layers of the dielectric composition of claim 6 and
b. layers of an internal electrode material comprising a metal portion selected from the group consisting of silver, palladium, mixtures thereof and alloys thereof.

19. The capacitor of claim 18 wherein the metal portion comprises at least 80 wt % silver, and less than 20 wt % palladium.

20. A multilayer ceramic chip capacitor having a dielectric constant greater than about 2000, a dissipation factor less than about 2%, meeting X7R and BX standards comprising a fired collection of alternately stacked:
a. layers of the dielectric composition of claim 11 and
b. layers of an internal electrode material comprising a metal portion selected from the group consisting of silver, palladium, mixtures thereof and alloys thereof.

21. The capacitor of claim 20 wherein the metal portion comprises at least 80 wt % silver, and less than 20 wt % palladium.

22. A method of forming an electronic component comprising:
a. alternately applying
  i. layers of the dielectric composition of claim 1 and
  ii. layers of an internal electrode material comprising a metal portion selected from the group consisting of silver, palladium, mixtures thereof and alloys thereof, onto a substrate to form a stack, and
b. firing the stack at a temperature not exceeding 1000° C. such that the dielectric fuses and the metal sinters.

23. The method of claim 22 wherein the metal portion comprises at least 80 wt % silver and less than 20 wt % palladium.

24. A method of forming an electronic component comprising:
a. alternately applying
  i. layers of the dielectric composition of claim 6 and
  ii. layers of an internal electrode material comprising a metal portion selected from the group consisting of silver, palladium, mixtures thereof and alloys thereof, onto a substrate to form a stack, and
b. firing the stack at a temperature not exceeding 1000° C. such that the dielectric fuses and the metal sinters.

25. The method of claim 24 wherein the metal portion comprises at least 80 wt % silver and less than 20 wt % palladium.

* * * * *